United States Patent Office 3,655,588
Patented Apr. 11, 1972

3,655,588
URETHANE-CONTAINING AMINIC POLYOLS
AND FOAMS DERIVED THEREFROM
Paul R. Mosso, Natrona Heights, and Carl R. Faelten, Pittsburgh, Pa., assignors to PPG Industries, Inc., Pittsburgh, Pa.
No Drawing. Filed Jan. 2, 1970, Ser. No. 384
Int. Cl. C08g 22/48
U.S. Cl. 260—2.5 AM
26 Claims

ABSTRACT OF THE DISCLOSURE

This invention relates to novel polyols containing urethane groups derived by coupling an aminic polyol with a polyisocyanate. Moreover, this invention relates to novel polyurethane resins, particularly novel polyurethane foams, prepared from the polyols of the invention.

STATE OF THE ART

Polyurethane foams derived from a polyol which is the reaction product of a mono-, di- or triethanolamine with alkylene oxides are known in the art, for example, see U.S. Pat. No. 3,094,434. It has been found, however, that these foams do not have sufficient low temperature dimensional stability, or blowing agent compatibility to produce low density foams which are wholly acceptable in certain applications.

DESCRIPTION OF THE INVENTION

It has now been found that polyurethane foams having improved low temperature dimensional stability are obtained by employing as the polyol in a polyurethane foam formulation a polyol derived from an ethanolamine such as monoethanol, diethanol, or triethanolamine, either per se or prepared in situ from the reaction of ammonia and ethylene oxide, said ethanolamine being reacted with a higher alkylene oxide, the higher alkylene oxide containing three or four carbon atoms and preferably propylene oxide. The amount of higher alkylene oxide utilized is preferably that amount which produces a polyol having a hydroxyl value between about 450 and about 550, thus in molar amounts this represents reacting about 2.7 to about 3.9 moles of alkylene oxide per mole of triethanolamine, about 3.5 to about 4.6 moles of alkylene oxide per mole of diethanolamine, and about 4.2 to about 5.4 moles of alkylene oxide per mole of monoethanolamine.

The polyol thus formed is then further reacted with an organic polyisocyanate. Generally between about 2 percent to about 14 percent by weight of the isocyanate is reacted with the polyol. Preferably about 6 percent to about 9 percent of the isocyanate is reacted with the polyol.

The urethane-containing polyols of the invention have substantially improved characteristics such as freeze resistance and improved K factor among others, which properties are especially noticeable at low densities, for example, at densities below about 2.0 and especially desirable are foams having open-blow densities of as low as about 0.9 lb./cu. ft. and molded densities of about 1.2 lbs./cu. ft. and preferably between about 1.4 lbs./cu. ft. and 1.6 lbs./cu. ft.

The polyether polyol component of the polyols of this invention can be prepared by reacting the components under substantially anhydrous conditions or, alternatively, in aqueous or solvent media, generally in the presence of an alkaline catalyst. The reaction is generally carried out at at least slightly-elevated temperatures, preferably between about 175° F. and about 275° F. and more preferably between about 200° F. and about 250° F., although lower or higher temperatures may be utilized if desired. The reaction is ordinarily carried out under superatmospheric pressures, which are generally maintained at a range of about 15 to about 75 p.s.i.g. and preferably between about 40 and about 50 p.s.i.g., although lower and higher pressures may also be employed. As previously stated, the ethanolamine employed may be prepared in situ by the reaction of ammonia with ethylene oxide, which reaction is again well-known in the art; for example, see U.S. Pat. No. 2,823,236; Kirk & Othmer, Encyclopedia of Chemical Technology, vol. I, 2nd edition (1963), pp. 814–824, Interscience Publishers; and Industrial and Engineering Chemistry, vol. 51, (1959), pp. 898–900, which are incorporated by reference.

The reaction of the alkanolamine with alkylene oxide is controlled by the addition of alkylene oxide. The temperature and pressure conditions are substantially as set forth above. If desired, the reaction may be conducted in two or more stages.

To form the urethane-containing polyols of the invention, the polyol described above is reacted with an organic polyisocyanate as set forth above, generally between about 2 percent and about 14 percent by weight of the isocyanate is reacted with the polyol. Preferably about 6 percent to about 9 percent of the isocyanate is reacted with the polyol. The reaction may be conducted over a broad range of conditions, for example, the temperature may vary from room temperature or below up to 250° F. or higher. Preferably the reaction temperature employed is between about 125° F. and about 175° F. The isocyanate is usually added to the polyol with rapid efficient stirring. The reaction usually is exothermic and some form of cooling may be employed to control the reaction temperature. After the exotherm has diminished, heat may be added to maintain the desired reaction temperature for a time sufficient to assure complete reaction, usually 30 minutes to an hour. Since isocyanates are water sensitive, it is preferred to conduct the reaction under dry conditions, which may be assured by employing a dry inert gas blanket in the reactor, for example, dry nitrogen; dry air may likewise be employed.

A highly desirable property of the novel polyols of this invention resides in their excellent compatibility with halocarbons widely utilized as blowing agents in polyurethane foams. This excellent compatibility with halocarbons is important in that it permits the preparation of rigid polyurethane foams having low densities while retaining excellent properties, as well as maintaining a uniform cell structure.

The polyurethane foams of the invention are generally prepared by reacting approximately one equivalent of polyol with one equivalent of organic polyisocyanate.

The organic polyisocyanate utilized to form the urethane group-containing polyol of the invention, as well as the polyisocyanate utilized to form the urethane resin or urethane foam, may be virtually any organic polyisocyanate having a functionality between about 2.1 and about 2.6.

These organic polyisocyanates include polymeric polyisocyanates such as:

Crude diphenylmethane-4,4'-diisocyanate, commonly referred to as crude MDI, having a functionality of about 2.5 to 2.6. Furthermore, although solid organic polyisocyanates can be utilized in the instant invention by melting them prior to reaction with the other foam-forming ingredients, it is preferred that liquid organic polyisocyanates be utilized.

Another organic polyisocyanate particularly useful is crude toluene diisocyanate, commonly referred to as crude TDI, containing about 85 percent TDI and about 15 percent polymeric isocyanate and having a functionality of about 2.1 and an NCO of 108 (Nacconate 4040).

Other isocyanates include undistilled crude TDI (Hylene TRF) with a viscosity of 500–1500 centipoises, a specific gravity of 1.26±0.03 and a total acidity of .01–.05 percent; and Mondur MT40, a crude polymeric isocyanate with an NCO value of 104–106, a viscosity of circa 50, which is approximately 60 percent MDI and 40 percent TDI with a functionality of 2.3.

Polymethylenepolyphenyl isocyanate, referred to as PAPI, having an isocyanate functionality greater than about 2.4 is also useful.

The relative amount of organic polyisocyanate utilized in polyurethane foam formulations is susceptible to variation over a substantial range. Usually the isocyanate component is employed in an amount which provides approximately one reactive isocyanato group for each reactive hydrogen of the other component, which is conventionally a polyol, polyamine or similar reactive hydrogen-containing material. However, some of the organic polyisocyanates tend to evaporate and it may be desirable to compensate for this loss. A range of about ½ equivalent to about 2 equivalents or organic polyisocyanate per equivalent of polyol component in the final material is ordinarily used, but smaller or larger amounts can be utilized. Preferably the foam formulation has an isocyanate index of between about 95 and about 130 and most preferably in an order of about 105.

In addition to the reactive components listed above, it has been found that the inclusion of water in rigid foam formulations based upon the novel polyols disclosed herein may give certain beneficial effects. Water, of course, will promote cellulation by reaction with diisocyanato groups to produce carbon dioxide, however, in addition to causing cellulation, it has been found to improve to some extent the dimensional stability of certain rigid polyurethane foams produced according to the teachings of this invention.

The polyols of the invention are self-catalytic; however, if desired, catalysts which promote the polyurethane linkage reactions in the final curing of the polyurethane resins may be added. These include tertiary amines of hydroxyl amines, organic salts of tin, and the like. The following constitutes a partial list of such catalysts: tetramethylethylenediamine (anhydrous) (TMEDA); tetramethyl guanidine (TMG); tetramethyl-1,3-butanediamine (TMBDA); triethylenediamine of the formula:

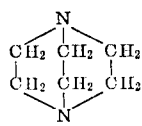

known as Dabco; dimethylethanolamine (DMEA); tin esters, such as stannous oleate, stannous octoate, dibutyl tin dilaurate, and the like.

Many other catalysts may be substituted for those listed above, if desired. The amount of catalyst used may be in a range of about 0.05 percent to about 5 percent or more by weight based upon the total of the polyols employed. Mixtures of the above and/or other catalysts may also be utilized.

To impart a foamed or cellular structure to the blended polyol-polyisocyanate mixture, a suitable gassing agent or system of gassing agents must be added or produced in situ. The liquid but relatively volatile hydrocarbons, such as the following perhalocarbons containing 1, 2 or even up to 4 carbon atoms, are especially desirable for the purpose. These include the following: $CCl_3F$; $CCl_2F_2$; $C_2Cl_2F_4$; $CHCl_2F$; $CClF_3$; $CHClF_2$. The halocarbons having 1 and 2 carbon atoms are preferred, and of these, trichloromonofluoromethane and dichlorodifluoromethane are particularly useful in commercial preparations. These are added as liquids in quantities of about 10 percent or less to about 20 percent or more, by weight of the total resin to the blended polyol-polyisocyanate mixtures, or to one or more components thereof, and are substantially volatilized in the liquid mixture to effect cellulation. Subsequently, the mixture cures to a hardened, cellular state.

Although the halocarbons are especially desirable as blowing agents when exceptional insulative properties are desired, other blowing agents, such as water, carbon dioxide, and the like, can be utilized in this invention.

A specially preferred blowing system which produces optimum low temperature dimensional stability is the combination of a chlorofluorocarbon described above and water. The systems comprise about 0.5 percent to about 1.5 percent water and about 12 percent to about 18 percent chlorofluorocarbon by weight, based on the total formulation, or, stated differently, about 3 percent to about 13 percent and preferably about 4 percent to about 9 percent water based on the weight of the chlorofluorocarbon blowing agent.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired. Many hundreds of these are available as commercial products. Some of these are listed in the publication Detergents and Emulsifiers—Up to Date 1960, published by John W. McCutcheon, Inc., 475 Fifth Avenue, New York 17, N.Y.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are ascribed the structure:

$$HO(C_2H_4O)_j(C_3H_6O)_k(C_2H_4O)_lH$$

Another class of surfactants comprises the so-called Tetronics, which are formed by the addition of propylene oxide to ethylene diamine, followed by the addition of ethylene oxide. These compounds have been ascribed the structure:

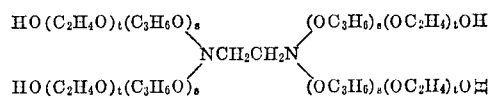

Another valuable class of surfactants comprises the so-called Tweens, which are described as the monoesters of higher fatty acids, represented by lauric acid, stearic acid, and oleic acid, and polyoxyethylene sorbitan.

Another of the more satisfactory surfactants which has been found very effectively to maintain the cell structure in the foaming and curing of polyurethane resins comprises soluble, liquid derivatives of the silicones. One such product is of the approximate structure:

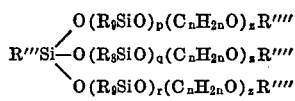

in which $R'''$ and $R''''$ are monovalent hydrocarbon radicals, while $R_9$ is a divalent hydrocarbon radical; $p$, $q$, and $r$ are integers equal to at least 1 and may be considerably higher, e.g., 2, 3, 4, 5, 6, or a higher number up to about 20; $n$ is a whole number from about 2 to about 4; and $z$ is an integer equal to at least 5 and may be higher, e.g., 6, 7, 8, 9, 10, or even higher, up to about 25. One such material is sold as Dow Corning-199. Still another highly useful silicone base surfactant comprises the so-called silicone L-521, represented by the following formula:

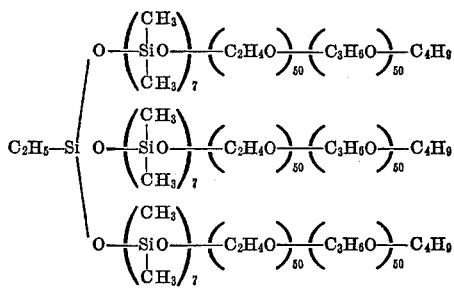

Other surfactants, especially the liquid or soluble nonionic ones, are also useful. The surfactants may be employed in amounts within a range of about 0.1 to about 3 percent by weight based upon the mixture of polyol component and the organic polyisocyanate component. In relatively dense foams, for example, those weighing about 5 or 6 pounds and upward per cubic foot, the surfactants may be omitted entirely.

The following examples illustrate in detail the preparation of the novel polyhydroxy resins and polyurethane foams thereof of this invention, but the invention is not to be construed as being limited solely thereto.

EXAMPLE I

An ethanolamine propylene oxide adduct was prepared as follows: The following ingredients were charged to an autoclave having an agitator and external heating means:

|  | Parts by weight |
|---|---|
| (1) Triethanolamine (commercial) | 1710 |
| (2) 50 percent sodium hydroxide solution | 17.1 |
| (3) Propylene oxide | 2275 |

1 and 2 were charged and heated to 220° F. The propylene oxide was then incrementally added, maintaining the pressure at about 40 p.s.i.g. maximum, and maintaining the reaction temperature between 220° F. and 240° F. The addition required about 7 hours. The reaction was maintained at 230° F. for one hour after the addition was completed.

The reaction mixture was then cooled and transferred to a vacuum distillation apparatus at a temperature of 115° F. and there was then added 219 parts of water and 15 parts of 85 percent phosphoric acid. The pH of the mixture was 10.0. The mixture was then vacuum stripped at 28°-10 mm. of Hg with the application of heat to a maximum temperature of 300° F. and held for one hour. 300 parts of distillate was collected. The product was cooled and filtered, the product had a viscosity of 400 centipoises and a hydroxyl value of 498.

In a similar manner, propylene oxide adducts of monoethanol amine and diethanol amine were prepared.

EXAMPLE II

A urethane containing polyol was prepared as follows: Into a reactor with agitator and a nitrogen atmosphere was charged 92 parts of the polyol of Example I. There was then added with rapid agitation 8 parts of crude TDI (Nacconate 4040) at a reaction temperature of 66° C. The reaction was exothermic and the temperature rose to 89° C. The reaction mixture was stirred for 30 minutes and then cooled. The product had a viscosity of 1880 centipoises at 78° F., a hydroxyl value of 436 and contained 3.91 percent nitrogen.

EXAMPLE III

In a similar manner to Example II, the following polyols were prepared:

(1) 92 parts of a one mole diethanolamine/3.9 moles propylene oxide adduct and 8 parts of Mondur MT-40 (same) with a hydroxyl number of 442 and a viscosity of 2,010 centipoises at 78° F.

(2) 92 parts of a one mole monoethanol amine/4.65 moles propylene oxide adduct and 8 parts of Mondur MT-40 with a hydroxyl number of 433 and a viscosity of 3,333 centipoises at 78° F.

(3) 92 parts of a one mole triethanolamine/3 moles propylene oxide adduct and 8 parts of crude TDI (NCO 108) with a hydroxyl number of 436 and a viscosity of 1880 centipoises at 78° F.

(4) 92 parts of a one mole triethanolamine/3 mole propylene oxide adduct and 8 parts of MDI with a hydroxyl number of 441 and a viscosity of 2140 centipoises at 78° F.

(5) 98 parts of one mole triethanolamine/3 moles propylene oxide adduct and 2 parts of Mondur MT-40 with a hydroxyl number of 482 and a viscosity of 570 centipoises at 78° F.

(6) 87 parts of one mole triethanolamine/3 moles propylene oxide adduct and 13 parts of Mondur MT-40 with a hydroxyl number of 389 and a viscosity of 9600 centipoises at 78° F.

(7) 92 parts of a one mole triethanolamine/3 moles propylene oxide adduct and 8 parts of Mondur MT-40 with a hydroxyl number of 421 and a viscosity of 2300 centipoises at 78° F.

(8) Control—a polyol which is a one mole triethanolamine/3 moles propylene oxide adduct with a hydroxyl number of 513 and a viscosity of 410 centipoises at 78° F.

EXAMPLE IV

Foams were prepared utilizing the polyols described in Example III. The foams in the following table were prepared by batch mixing parts A and B both at a temperature of 55° F. for the times indicated and foaming the mixture in a 1¾" x 10½" x 24 inch aluminum mold preheated to 130° F. The mold was a closed mold with two ⅛" weep holes. The foams were post cured at 130° F. for 30 minutes to one hour. The foams had excellent K factors and low temperature dimensional stability and the polyol systems showed improved compatability with the fluorocarbon blowing agents. K factor was determined by the thermal probe method, ASTM D2326-64T, initially and at 10, 20, 40 and 80 days. Foams from the polyols of this invention showed particularly improved results on an industrial foam machine scale.

TABLE I

| Foam designation | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| MIX A (in parts): | | | | | | | | | | | | | | | |
| Nacconate 4040 | 105 | 105 | 105 | 105 | | 105 | 105 | 105 | | | | | 105 | | 105 |
| Mondur MT-40 | | | | | 105 | | | | | | | | | 105 | |
| Hylene TRF | | | | | | | | | 105 | 105 | 105 | 105 | | | |
| $Cl_3FC$ | 15 | 15 | 15 | 15 | 15 | 15 | 15 | 15 | 15 | 15 | 15 | 15 | 15 | 15 | 15 |
| MIX B (in parts): | | | | | | | | | | | | | | | |
| Urethane-containing polyol | 82 | 82 | 82 | 82 | 87 | 75 | 93 | 82 | 63 | 70 | 78 | | | | 86 |
| (As in Example III) | (1) | (2) | (3) | (4) | (4) | (5) | (6) | (7) | (5) | (7) | (6) | | | | (7) |
| No. 8 of Example III (control) | | | | | | | | | | | | 58 | 69 | 72 | |
| Emulsifier (L-521) | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| 80 DMEA/20 DABCO | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| $Cl_3FC$ | 21 | 21 | 21 | 21 | 22 | 19.6 | 23.5 | 21.5 | 17.5 | 19.0 | 20 | 17 | 18.5 | 19 | 22 |
| Mix time (seconds) | 8 | 8 | 6 | 6 | 6 | 6 | 6 | 6 | 6 | 6 | 6 | 6 | 5 | 5 | 6 |
| Cream time (seconds) | 13 | 15 | 10 | 10 | 10 | 9 | 11 | 10 | 10 | 10 | 10 | 10 | 9 | 9 | 11 |
| Set time (seconds) | 61 | 74 | 38 | 38 | 42 | 35 | 43 | 39 | 43 | 47 | 43 | 37 | 35 | 51 | |
| Density (lbs./cu. ft.) | 1.49 | 1.47 | 1.50 | 1.50 | 1.50 | 1.51 | 1.53 | 1.51 | 1.49 | 1.50 | 1.52 | 1.50 | 1.51 | 1.47 | 1.50 |
| $K_1$ | 0.129 | 0.130 | 0.123 | 0.123 | 0.134 | 0.127 | 0.118 | 0.123 | 0.123 | 0.120 | 0.121 | 0.116 | 0.133 | 0.141 | 0.130 |
| $K_{10}$ | 0.135 | 0.136 | 0.127 | 0.128 | 0.141 | 0.131 | 0.120 | 0.125 | 0.124 | 0.122 | 0.122 | 0.125 | 0.133 | 0.143 | 0.136 |
| $K_{20}$ | 0.141 | 0.147 | 0.130 | 0.131 | 0.151 | 0.133 | 0.124 | 0.134 | 0.131 | 0.124 | 0.125 | 0.129 | 0.137 | 0.150 | 0.139 |
| $K_{40}$ | 0.146 | 0.152 | 0.141 | 0.135 | 0.154 | 0.143 | 0.127 | 0.137 | 0.139 | 0.130 | 0.128 | 0.134 | 0.141 | 0.159 | 0.149 |
| $K_{80}$ | 0.158 | 0.157 | 0.145 | 0.145 | 0.174 | 0.147 | 0.143 | 0.148 | | 0.139 | 0.136 | 0.148 | 0.153 | 0.169 | 0.149 |

Other isocyanate-modified polyols and isocyanates as well as conventional adjuvants such as those described hereinabove can be substituted for those exemplified and equivalent results obtained.

According to the provisions of the patent statutes, there are described above the invention and what are now considered its best embodiments; however, within the scope of the appended claims, it is to be understood that the invention can be practiced otherwise than as specifically described.

We claim:

1. A polyol formed by reacting:
    (A) an aminic polyol which is the reaction product of an ethanolamine selected from the group consisting of monoethanolamine, diethanolamine and triethanolamine and an alkylene oxide having 3 to 4 carbon atoms, having a hydroxyl value between about 450 and about 550, and
    (B) between about 2 percent and about 14 percent by weight of (A) of an organic polyisocyanate having a functionality between about 2.1 and about 2.6.

2. A polyol as in claim 1 which is formed by reacting:
    (A) an aminic polyol which is the reaction product of an ethanolamine selected from the group consisting of monoethanolamine, diethanolamine and triethanolamine and an alkylene oxide having 3 to 4 carbon atoms, having a hydroxyl value between about 450 and about 550, and
    (B) between about 2 percent and about 14 percent by weight of (A) of an organic polyisocyanate having a functionality between about 2.1 and about 2.6, at a temperature of up to about 250° F.

3. A polyol as in claim 2 wherein the alkylene oxide is propylene oxide.

4. A polyol as in claim 3 wherein about 6 to about 9 percent of said organic polyisocyanate is employed.

5. A polyol as in claim 3 wherein the organic polyisocyanate is a mixture containing toluene diisocyanate.

6. A polyol as in claim 1 formed by reacting:
    (A) an aminic polyol which is the reaction product of triethanolamine and about 2.7 to about 3.9 moles of propylene oxide, and
    (B) between about 2 percent and about 14 percent by weight of (A) of an organic polyisocyanate having a functionality between about 2.1 and about 2.6.

7. A polyol as in claim 6 formed by reacting:
    (A) an aminic polyol which is the reaction product of triethanolamine and about 2.7 to about 3.9 moles of propylene oxide, and
    (B) between about 2 percent and about 14 percent by weight of (A) of an organic polyisocyanate having a functionality between about 2.1 and about 2.6, at a temperature of up to about 250° F.

8. A polyol as in claim 7 wherein about 6 to about 9 percent of said organic polyisocyanate is employed.

9. A polyol as in claim 8 wherein the organic polyisocyanate is a mixture containing toluene diisocyanate.

10. A cellular rigid polyurethane resin having a density below two pounds per cubic foot displaying an improved K factor prepared from a mixture comprising:
    (1) a polyol formed by reacting:
        (A) an aminic polyol which is the reaction product of an ethanolamine selected from the group consisting of monoethanolamine, diethanolamine and triethanolamine, and an alkylene oxide having 3 to 4 carbon atoms, having a hydroxyl value between about 450 and about 550, and
        (B) between about 2 percent and about 14 percent by weight of (A) of an organic polyisocyanate having a functionality between about 2.1 and about 2.6; and
    (2) an organic polyisocyanate having a functionality between about 2.1 and about 2.6; and
    (3) a blowing agent,
the ratio of isocyanate to polyol being between about one-half and about two equivalents of polyisocyanate per equivalent of polyol.

11. A cellular polyurethane resin as in claim 10 prepared from a mixture comprising:
    (1) a polyol formed by reacting:
        (A) an aminic polyol which is the reaction product of an ethanolamine selected from the group consisting of monoethanolamine, diethanolamine and triethanolamine and an alkylene oxide having 3 to 4 carbon atoms, having a hydroxyl value between about 450 and about 550; and
        (B) between about 2 percent and about 14 percent by weight of (A) of an organic polyisocyanate having a functionality between about 2.1 and about 2.6, at a temperature of up to about 250° F.;
    (2) an organic polyisocyanate having a functionality between about 2.1 and about 2.6; and
    (3) a blowing agent.

12. A cellular polyurethane resin as in claim 11 wherein the alkylene oxide is propylene oxide.

13. A cellular polyurethane resin as in claim 12 wherein in (1) about 6 to about 9 percent of said organic polyisocyanate (1)(B) is reacted with said polyol (1)(A).

14. A cellular polyurethane resin as in claim 13 wherein said organic polyisocyanate (1)(B) is a mixture containing toluene diisocyanate.

15. A cellular polyurethane resin as in claim 11 prepared from a mixture comprising:
    (1) a polyol formed by reacting:
        (A) an aminic polyol which is the reaction product of an ethanolamine selected from the group consisting of monoethanolamine, diethanolamine and triethanolamine and an alkylene oxide having 3 to 4 carbon atoms, having a hydroxyl value between about 450 and about 550, and
(B) between about 2 percent and about 14 percent by weight of (A) of an organic polyisocyanate having a functionality between about 2.1 and about 2.6;
(2) an organic polyisocyanate having a functionality between about 2.1 and about 2.6;
(3) a blowing agent which is a mixture of a chlorofluorocarbon and water; and
(4) an emulsifier for the mixture.

16. A cellular polyurethane resin as in claim 15 wherein the alkylene oxide is propylene oxide.

17. A cellular polyurethane resin as in claim 16 wherein in (1) about 6 to about 9 percent of said organic polyisocyanate (1)(B) is reacted with said polyol (1)(A).

18. A cellular polyurethane resin as in claim 17 wherein said organic polyisocyanate (1)(B) is a mixture containing toluene diisocyanate.

19. A cellular rigid polyurethane resin having a density below 2 pounds per cubic foot displaying an improved K factor prepared from a mixture comprising:
(1) a polyol formed by reacting:
(A) an aminic polyol which is the reaction product of triethanolamine and about 2.7 to about 3.9 moles of propylene oxide, and
(B) between about 2 percent and about 14 percent by weight of (A) of an organic polyisocyanate having a functionality between about 2.1 and about 2.6;
(2) an organic polyisocyanate having a functionality between about 2.1 and about 2.6; and
(3) a blowing agent.

20. A cellular polyurethane resin as in claim 19 wherein in (1) about 6 to about 9 percent of said organic polyisocyanate (1)(B) is reacted with said polyol (1)(A).

21. A cellular polyurethane resin as in claim 20 wherein said organic polyisocyanate (1)(B) comprises toluene diisocyanate.

22. A cellular polyurethane resin as in claim 21 prepared from a mixture comprising:

(1) a polyol formed by reacting:
(A) an aminic polyol which is the reaction product of triethanolamine and about 2.7 to about 3.9 moles of propylene oxide, and
(B) between about 2 percent and about 14 percent by weight of (A) of an organic polyisocyanate having a functionality between about 2.1 and about 2.6;
(2) an organic polyisocyanate having a functionality between about 2.1 and about 2.6;
(3) a blowing agent which is a mixture of a chlorofluorocarbon and water; and
(4) an emulsifier for the mixture.

23. A cellular polyurethane resin as in claim 22 wherein in (1) about 6 to about 9 percent of said organic polyisocyanate (1)(B) is reacted with said polyol (1)(A).

24. A cellular polyurethane resin as in claim 23 wherein said organic polyisocyanate (1)(B) is a mixture containing toluene diisocyanate.

25. A cellular polyurethane resin as in claim 23 wherein the blowing agent comprises about 3 percent to about 13 percent water.

26. A cellular polyurethane resin as in claim 23 wherein the blowing agent comprises about 4 percent to about 9 percent water.

References Cited
UNITED STATES PATENTS

| | | | |
|---|---|---|---|
| 3,094,434 | 6/1963 | Chapman et al. | 260—2.5 |
| 3,072,582 | 1/1963 | Frost | 260—2.5 |
| 3,424,700 | 1/1969 | Booth et al. | 260—2.5 |

FOREIGN PATENTS

| | | | |
|---|---|---|---|
| 1,071,457 | 6/1967 | Great Britain | 260—77.5 |

DONALD E. CZAJA, Primary Examiner

E. C. RZUCIDLO, Assistant Examiner

U.S. Cl. X.R.

260—2.5 AQ, 77.5 AM, 77.5 AQ